United States Patent
Lin

(10) Patent No.: US 9,946,422 B2
(45) Date of Patent: Apr. 17, 2018

(54) IN-CELL TOUCH PANEL

(71) Applicant: Raydium Semiconductor Corporation, Hsinchu (TW)

(72) Inventor: Yi-Ying Lin, Hualien (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 0 days.

(21) Appl. No.: 15/138,007

(22) Filed: Apr. 25, 2016

(65) Prior Publication Data

US 2016/0313831 A1 Oct. 27, 2016

Related U.S. Application Data

(60) Provisional application No. 62/153,045, filed on Apr. 27, 2015.

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC ...... G06F 3/0412; G06F 3/044; G06F 1/1643; G06F 1/1692; G06F 3/03547; G06F 3/041; G06F 3/0416; G06F 3/0426; G06F 3/0488; G06F 2203/0339; G06F 2203/04103; G06F 2203/04104; G06F 2203/04112; Y10S 379/916; G05B 2219/13031; G05B 2219/23037; G05B 2219/23044; G05B 2219/23377; G05B 2219/23378; G05B 2219/36168; G05B 2219/36425; G05B 2219/40581; H04N 1/00411; H04N 2005/443; H01L 27/323; H01L 27/3225; H01L 27/3232; B60K 2350/1024; B60K 2350/1028; B60K 2350/1036;

(Continued)

(56) References Cited

U.S. PATENT DOCUMENTS

2015/0062457 A1* 3/2015 Kida ...................... G06F 3/044
    349/12
2015/0091849 A1* 4/2015 Ludden ................ G06F 3/0412
    345/174

(Continued)

OTHER PUBLICATIONS

Epoxy, Palu Schlack, 1934.*

(Continued)

*Primary Examiner* — Vinh T Lam

(57) ABSTRACT

An in-cell touch panel including pixels is disclosed. A laminated structure of each pixel includes a substrate, a TFT layer, a color filter layer, at least one protrusion, a first conductive layer and a second conductive layer. The TFT layer is disposed on the substrate. The color filter layer is disposed above the TFT layer. The at least one protrusion is disposed under the color filter layer opposite to the TFT layer. The first conductive layer is disposed above the TFT layer opposite to the color filter layer. The second conductive layer is disposed on the at least one protrusion. The first conductive layer and a part of second conductive layer are electrically connected, so that the first conductive layer which is disposed near the TFT layer and not electrically connected originally can be electrically connected through the second conductive layer disposed near the color filter layer.

14 Claims, 3 Drawing Sheets

(58) Field of Classification Search
CPC .......... B60K 2350/104; G07F 17/3209; A61M 2205/505; A63F 2009/2408; A63F 2009/241; A63F 13/2145; A63F 2300/1075; G02F 1/13338; D05D 2205/085; H03K 17/96; H03K 2017/96; H03K 17/962; H03K 2217/96015; H03K 2217/960755; H03K 2217/96031; H03K 2217/9607; H03K 2017/96; G04G 21/08; H03J 2200/26; G01C 21/3664; A61H 2201/5043; A61H 2201/5046; F21V 23/0485
USPC .................. 345/173–175; 178/18.01–18.06; 257/83–84, 146
See application file for complete search history.

(56) References Cited

U.S. PATENT DOCUMENTS

2016/0103517 A1\* 4/2016 Kang .................. G06F 3/044
 345/174
2016/0313848 A1\* 10/2016 Rhee .................. G06F 3/0412

OTHER PUBLICATIONS

Anisotropy Conductive Film, Hitachi Chemicals, late 1970 to early 1980.\*
BoPET, Dupont, mid-1950.\*

\* cited by examiner

IN-CELL TOUCH PANEL

BACKGROUND OF THE INVENTION

Field of the Invention

This invention relates to a touch panel, especially to an in-cell touch panel.

Description of the Related Art

In general, capacitive touch panels can be divided into several different types (e.g., the in-cell capacitive touch panel and on-cell capacitive touch panel) based on different laminated structures.

Compared to the conventional one-glass solution (OGS) touch panel and on-cell capacitive touch panel, the in-cell capacitive touch panel can achieve the thinnest touch panel design and it can be widely used in portable electronic products such as cell phone, tablet PC and notebook PC.

However, as shown in FIG. 1, when the sensing electrodes 10 and their traces 12 are both disposed in the same layer of the in-cell self-capacitive touch panel, the layout of the traces 12 will cause the problems of different sizes of the sensing electrodes 10 and the dead zone, and the touch sensing performance of the in-cell self-capacitive touch panel will become poor. These problems need to be further overcome.

SUMMARY OF THE INVENTION

Therefore, the invention provides an in-cell touch panel to solve the above-mentioned problems.

An embodiment of the invention is an in-cell touch panel. In this embodiment, the in-cell touch panel includes a plurality of pixels. A laminated structure of each pixel includes a substrate, a TFT layer, a color filter layer, at least one protrusion, a first conductive layer and a second conductive layer. The TFT layer is disposed on the substrate. The color filter layer is disposed above the TFT layer. The at least one protrusion is disposed under the color filter layer opposite to the TFT layer. The first conductive layer is disposed above the TFT layer opposite to the color filter layer. The second conductive layer is disposed on the at least one protrusion. The first conductive layer and a part of the second conductive layer are electrically connected, so that the first conductive layer which is disposed near the TFT layer and not electrically connected originally can be electrically connected through the second conductive layer disposed near the color filter layer.

In an embodiment, the in-cell touch panel is an in-cell self-capacitive touch panel.

In an embodiment, the at least one protrusion is a spacer or a bump.

In an embodiment, the first conductive layer disposed near the TFT layer is used as touch sensing electrode traces.

In an embodiment, the first conductive layer is electrically connected with a common electrode of the in-cell touch panel.

In an embodiment, the common electrode is divided into a plurality of common electrode regions. The first conductive layer is electrically connected with the plurality of common electrode regions respectively to form a plurality of touch sensing electrodes.

In an embodiment, the plurality of touch sensing electrodes has the same sensing area.

In an embodiment, the second conductive layer disposed near the color filter layer is disposed under the color filter layer bypassing the at least one protrusion and used as touch sensing electrode traces.

In an embodiment, another protrusion is disposed out of an active area (AA) of the in-cell touch panel and used to guide the traces of the touch sensing electrodes disposed near the color filter layer to a side near the TFT layer.

In an embodiment, a conductive adhesive including conductive pillars is coated between the TFT layer and the color filter layer and used to guide the traces of the touch sensing electrodes disposed near the color filter layer to a side near the TFT layer.

In an embodiment, the at least one protrusion is formed by organic material or in organic material.

In an embodiment, the second conductive layer is formed by transparent conductive material or opaque conductive material.

In an embodiment, the color filter layer includes a light blocking layer. The at least one protrusion and the second conductive layer are both disposed under the light blocking layer.

In an embodiment, conductive material or non-conductive material is disposed between the first conductive layer and the TFT layer out of the active area of the in-cell touch panel.

Compared to the prior art, the in-cell touch panel of the invention has the following advantages:

(1) The in-cell self-capacitive touch panel of the invention having a simpler laminated design can be easily manufactured and the costs can be reduced.

(2) The in-cell self-capacitive touch panel of the invention has simple design of the touch sensing electrodes and their traces.

(3) The layout of the in-cell self-capacitive touch panel of the invention can reduce the effects on the LCD electrical properties.

(4) The layout of the in-cell self-capacitive touch panel of the invention can reduce the effects on the LCD optical properties.

The advantage and spirit of the invention may be understood by the following detailed descriptions together with the appended drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
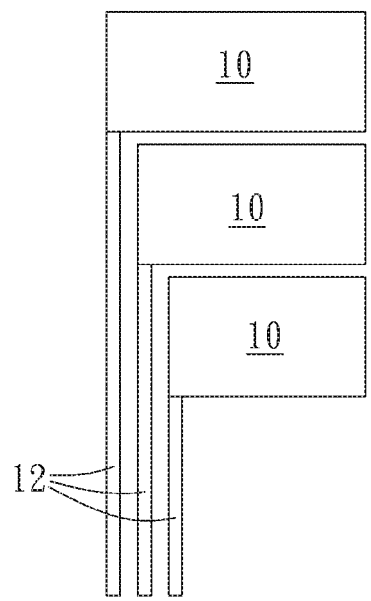
FIG. 1 illustrates a schematic diagram of different sizes of sensing electrodes and the dead zone caused by the layout of the sensing electrodes and their traces when they are both disposed in the same layer of the in-cell self-capacitive touch panel in the prior art.
Figure 2:
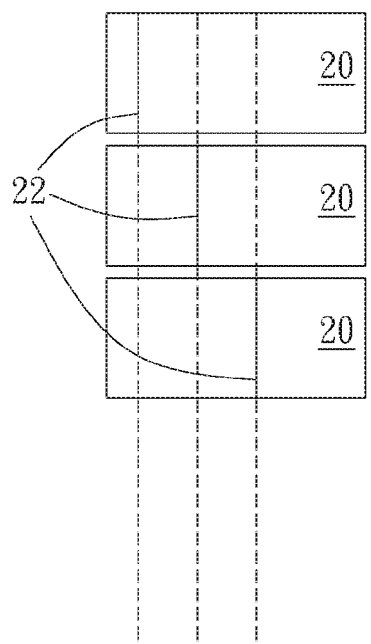
FIG. 2 illustrates a schematic diagram of the same size of sensing electrodes without dead zone caused by the layout of the sensing electrodes and their traces when they are disposed in different layers of the in-cell self-capacitive touch panel of the invention.

An in-cell self-capacitive touch panel is disclosed in the invention. As shown in FIG. 2, because the sensing electrodes 20 and their traces 22 are disposed in different layers of the in-cell self-capacitive touch panel respectively, the sensing electrodes 20 will have the same size and no dead zone will be generated.

Compared to the prior art which the bridge structure is disposed near the TFT layer, the bridge structure in the laminated structure of the in-cell self-capacitive touch panel of the invention is disposed near the color filtering layer. Not only the laminated structure of the in-cell self-capacitive touch panel can become simpler and the yield can be enhanced, but also the effects on the parasitic capacitance and electrical properties of the TFT layer caused by the trace layout can be reduced.

Figure 3:
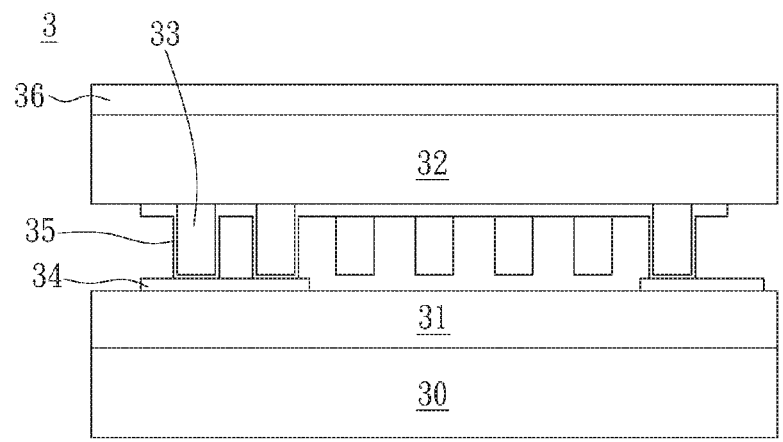
FIG. 3 illustrates a cross-sectional schematic diagram of the laminated structure of the in-cell self-capacitive touch panel in an embodiment of the invention.

An embodiment of the invention is an in-cell self-capacitive touch panel. Please refer to FIG. 3. FIG. 3 illustrates a cross-sectional schematic diagram of the laminated structure of the in-cell self-capacitive touch panel in this embodiment.

As shown in FIG. 3, the laminated structure 3 of the in-cell self-capacitive touch panel includes a substrate 30, a TFT layer 31, a color filter layer 32, at least one protrusion 33, a first conductive layer 34, a second conductive layer 35 and a color filter layer substrate 36. The TFT layer 31 is disposed on the substrate 30. The color filter layer 32 is disposed above the TFT layer 31. The color filter layer substrate 36 is disposed above the color filter layer 32. The at least one protrusion 33 is disposed under the color filter layer 32 opposite to the TFT layer 31. The first conductive layer 34 is disposed above the TFT layer 31 opposite to the color filter layer 32 and used as touch sensing electrode traces. The first conductive layer 34 is electrically connected with a common electrode (VCOM) of the in-cell self-capacitive touch panel. The second conductive layer 35 is disposed on the at least one protrusion 33. The second conductive layer 35 can be formed by transparent conductive material or opaque conductive material without specific limitations.

It should be noticed that the first conductive layer 34 disposed above the TFT layer 31 and a part of the second conductive layer 35 disposed on the at least one protrusion 33 will be electrically connected, so that the first conductive layer 34 which is disposed near the TFT layer 31 and not electrically connected originally can be electrically connected through the second conductive layer 35 disposed near the color filter layer 32.

In practical applications, the at least one protrusion 33 can be a spacer or a bump; the at least one protrusion 33 can be formed by organic material or inorganic material. The number of the at least one protrusion 33 and the gap between them can be determined based practical needs without specific limitations. In addition, the color filter layer 32 can include a light blocking layer (e.g., a black matrix (BM), but not limited to this) and the at least one protrusion 33 and the second conductive layer 35 should be disposed under the light blocking layer.

Figures 4A, 4B:
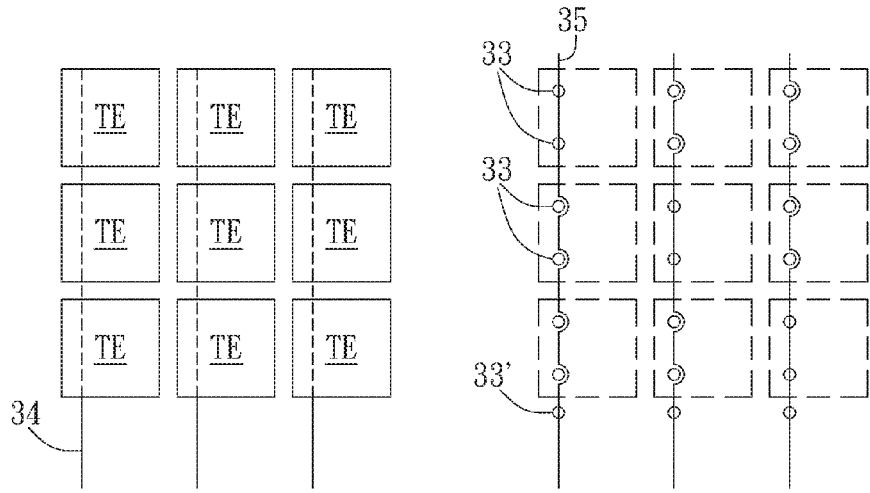
FIG. 4A illustrates a schematic diagram of the layout of traces disposed near the TFT layer in the in-cell self-capacitive touch panel.
FIG. 4B illustrates a schematic diagram of the layout of traces disposed near the color filtering layer in the in-cell self-capacitive touch panel.

Please refer to FIG. 4A and FIG. 4B. FIG. 4A illustrates a schematic diagram of the layout of traces disposed near the TFT layer 31 in the in-cell self-capacitive touch panel; FIG. 4B illustrates a schematic diagram of the layout of traces disposed near the color filtering layer 32 in the in-cell self-capacitive touch panel.

It should be noticed that the solid lines in FIG. 4A represent the traces disposed near the TFT layer 31 and the dotted lines in FIG. 4A represent the traces disposed near the color filtering layer 32; the solid lines in FIG. 4B represent the traces disposed near the color filtering layer 32 and the circles in FIG. 4B represent the at least one protrusion 33.

As shown in FIG. 4A, the common electrode of the in-cell self-capacitive touch panel is disposed near the TFT layer 31. The common electrode can be divided into a plurality of common electrode regions used as a plurality of touch sensing electrodes TE illustrated by the solid lines. The first conductive layer 34 disposed near the TFT layer 31 is used as the traces of the plurality of touch sensing electrodes TE respectively. It should be noticed that the plurality of touch sensing electrodes TE has the same sensing area. In fact, the plurality of touch sensing electrodes TE can have random geometries without specific limitations.

As shown in FIG. 4B, the relative positions of the touch sensing electrodes TE not disposed near the color filtering layer 32 are illustrated by the dotted lines. The second conductive layer 35 disposed near the color filtering layer 32 can be not only disposed on the at least one protrusion 33, but also disposed under the color filtering layer 32 bypassing the at least one protrusion 33 and used as the traces of the touch sensing electrodes, but not limited to this.

It should be noticed that when the second conductive layer 35 is disposed on the at least one protrusion 33, the second conductive layer 35 will be electrically connected with the first conductive layer 34 disposed near the TFT layer 31; when the second conductive layer 35 is disposed under the color filtering layer 32 bypassing the at least one protrusion 33, the second conductive layer 35 will be not electrically connected with the TFT layer 31 or the first conductive layer 34 disposed near the TFT layer 31.

In addition, another protrusion 33' can be disposed out of the active area (AA) of the in-cell touch panel and used to guide the touch sensing electrode traces (the second conductive layer 35) disposed near the color filter layer 32 to a side near the TFT layer 31, but not limited to this.

In another embodiment, if no protrusion 33' is disposed out of the active area of the in-cell touch panel, a conductive adhesive including conductive pillars can be coated between the TFT layer 31 and the color filter layer 32 to guide the touch sensing electrode traces (the second conductive layer 35) disposed near the color filter layer 32 to a side near the TFT layer 31, but not limited to this.

Figure 5:
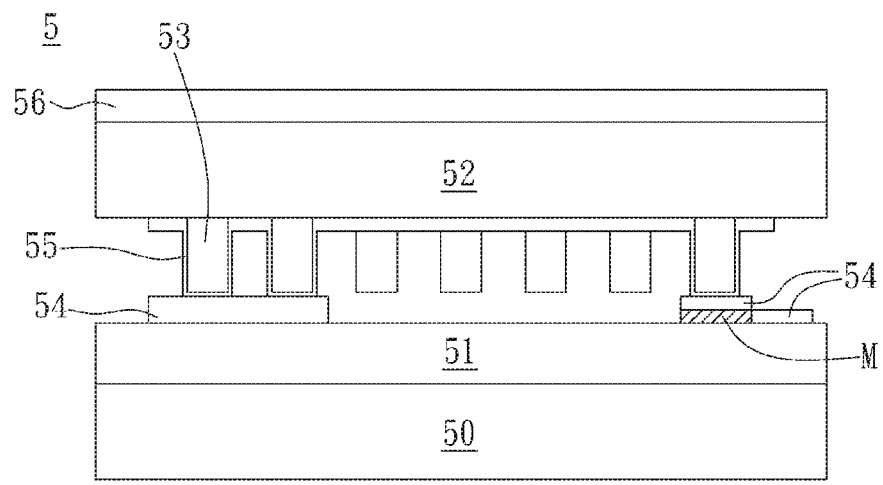
FIG. 5 illustrates a cross-sectional schematic diagram of the laminated structure of the in-cell self-capacitive touch panel in another embodiment of the invention.

Then, please refer to FIG. 5. FIG. 5 illustrates a cross-sectional schematic diagram of the laminated structure of the in-cell self-capacitive touch panel in another embodiment of the invention.

As shown in FIG. 5, the laminated structure 5 of the in-cell self-capacitive touch panel includes a substrate 50, a TFT layer 51, a color filter layer 52, at least one protrusion 53, a first conductive layer 54, a second conductive layer 55 and a color filter layer substrate 56. The TFT layer 51 is disposed on the substrate 50. The color filter layer 52 is disposed above the TFT layer 51. The color filter layer substrate 56 is disposed above the color filter layer 52. The at least one protrusion 53 is disposed under the color filter layer 52 opposite to the TFT layer 51. The first conductive layer 54 is disposed above the TFT layer 51 opposite to the color filter layer 52 and used as touch sensing electrode traces. The first conductive layer 54 is electrically connected with a common electrode of the in-cell self-capacitive touch panel. The second conductive layer 55 is disposed on the at least one protrusion 53. The second conductive layer 55 can be formed by transparent conductive material or opaque conductive material without specific limitations.

It should be noticed that the first conductive layer 54 disposed above the TFT layer 51 and a part of the second conductive layer 55 disposed on the at least one protrusion 53 will be electrically connected, so that the first conductive layer 54 which is disposed near the TFT layer 51 and not electrically connected originally can be electrically connected through the second conductive layer 55 disposed near the color filter layer 52. In addition, conductive material or non-conductive material M can be disposed between the first conductive layer 54 and the TFT layer 51 out of the active area of the in-cell touch panel to maintain well electrical connections.

Figures 6A, 6B:
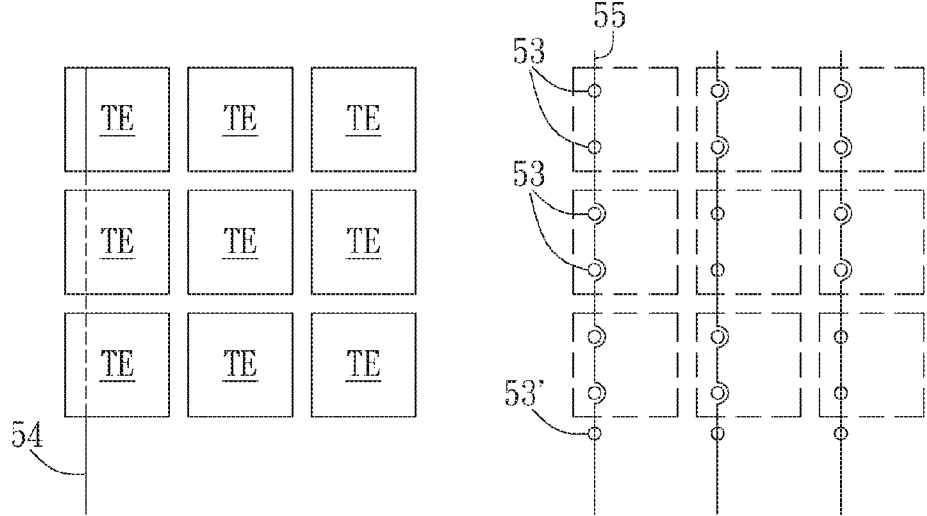
FIG. 6A illustrates a schematic diagram of the layout of traces disposed near the TFT layer in the in-cell self-capacitive touch panel.
FIG. 6B illustrates a schematic diagram of the layout of traces disposed near the color filtering layer in the in-cell self-capacitive touch panel.

Please refer to FIG. 6A and FIG. 6B. FIG. 6A illustrates a schematic diagram of the layout of traces disposed near the TFT layer 51 in the in-cell self-capacitive touch panel; FIG. 6B illustrates a schematic diagram of the layout of traces disposed near the color filtering layer 52 in the in-cell self-capacitive touch panel.

It should be noticed that the solid lines in FIG. 6A represent the traces disposed near the TFT layer 51 and the dotted lines in FIG. 6A represent the traces disposed near the color filtering layer 52; the solid lines in FIG. 6B represent the traces disposed near the color filtering layer 52 and the circles in FIG. 6B represent the at least one protrusion 53.

As shown in FIG. 6A, the common electrode of the in-cell self-capacitive touch panel is disposed near the TFT layer 51. The common electrode can be divided into a plurality of common electrode regions used as a plurality of touch sensing electrodes TE illustrated by the solid lines. The plurality of touch sensing electrodes TE has the same sensing area. The first conductive layer 54 disposed near the TFT layer 51 is used as the traces of the plurality of touch sensing electrodes TE respectively. It should be noticed that additional first conductive layer can be added into the traces disposed on the relative positions near the TFT layer 51 in the region to be conducted, so that the inner resistance of the touch sensing electrodes TE can be reduced.

As shown in FIG. 6B, the relative positions of the touch sensing electrodes TE not disposed near the color filtering layer 52 are illustrated by the dotted lines. The second conductive layer 55 disposed near the color filtering layer 52 can be not only disposed on the at least one protrusion 53, but also disposed under the color filtering layer 52 bypassing the at least one protrusion 53 and used as the traces of the touch sensing electrodes, but not limited to this. In addition, another protrusion 53' can be disposed out of the active area of the in-cell touch panel and used to guide the touch sensing electrode traces (the second conductive layer 55) disposed near the color filter layer 52 to a side near the TFT layer 51, but not limited to this.

Compared to the prior art, the in-cell touch panel of the invention has the following advantages:

(1) The in-cell self-capacitive touch panel of the invention having a simpler laminated design can be easily manufactured and the costs can be reduced.

(2) The in-cell self-capacitive touch panel of the invention has simple design of the touch sensing electrodes and their traces.

(3) The layout of the in-cell self-capacitive touch panel of the invention can reduce the effects on the LCD electrical properties.

(4) The layout of the in-cell self-capacitive touch panel of the invention can reduce the effects on the LCD optical properties.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. An in-cell touch panel, comprising:
    a plurality of pixels, a laminated structure of each pixel comprising:
        a substrate;
        a thin-film transistor (TFT) layer disposed on the substrate;
        a color filter layer disposed above the TFT layer;
        at least one protrusion disposed under the color filter layer opposite to the TFT layer;
        two first conductive layers separately disposed above the TFT layer opposite to the color filter layer; and
        a second conductive layer directly disposed on the at least one protrusion;
    wherein the two first conductive layers are electrically connected with a part of the second conductive layer respectively, so that the two first conductive layers which are separately disposed near the TFT layer can be electrically connected through the second conductive layer which is directly disposed on the at least one protrusion.

2. The in-cell touch panel of claim 1, wherein the in-cell touch panel is an in-cell self-capacitive touch panel.

3. The in-cell touch panel of claim 1, wherein the at least one protrusion is a spacer or a bump.

4. The in-cell touch panel of claim 1, wherein the two first conductive layers disposed near the TFT layer are used as touch sensing electrode traces.

5. The in-cell touch panel of claim 4, wherein the two first conductive layers are electrically connected with a common electrode of the in-cell touch panel.

6. The in-cell touch panel of claim 5, wherein the common electrode is divided into a plurality of common electrode regions, the two first conductive layers are electrically connected with the plurality of common electrode regions respectively to form a plurality of touch sensing electrodes.

7. The in-cell touch panel of claim 5, wherein the plurality of touch sensing electrodes have a same sensing area.

8. The in-cell touch panel of claim 1, wherein the second conductive layer is disposed under the color filter layer bypassing the at least one protrusion and used as touch sensing electrode traces.

9. The in-cell touch panel of claim 8, wherein another protrusion is disposed out of the plurality of touch sensing electrodes and used to guide the touch sensing electrode traces disposed near the color filter layer to a side near the TFT layer.

10. The in-cell touch panel of claim 8, wherein a conductive adhesive comprising conductive pillars is coated between the FT layer and the color filter layer and used to guide the touch sensing electrode traces disposed near the color filter layer to a side near the TFT layer.

11. The in-cell touch panel of claim 1, wherein the at least one protrusion is formed by organic material or inorganic material.

12. The in-cell touch panel of claim 1, wherein the second conductive layer is formed by transparent conductive material or opaque conductive material.

13. The in-cell touch panel of claim 1, wherein, the color filter layer comprises a light blocking layer, and the at least one protrusion and the second conductive layer are both disposed under the light blocking layer.

14. The in-cell touch panel of claim 1, wherein conductive material or non-conductive material is disposed between the two first conductive layers and the TFT layer out of the plurality of touch sensing electrodes.

* * * * *